US011571931B2

(12) United States Patent
Kitago et al.

(10) Patent No.: US 11,571,931 B2
(45) Date of Patent: Feb. 7, 2023

(54) METHOD FOR MANUFACTURING RUBBER COMPOSITION FOR TIRE AND METHOD FOR MANUFACTURING TIRE

(71) Applicant: SUMITOMO RUBBER INDUSTRIES, LTD., Kobe (JP)

(72) Inventors: Ryota Kitago, Kobe (JP); Ryuichi Tokimune, Kobe (JP); Soh Ishino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 158 days.

(21) Appl. No.: 15/767,741

(22) PCT Filed: Sep. 21, 2016

(86) PCT No.: PCT/JP2016/077795
§ 371 (c)(1),
(2) Date: Apr. 12, 2018

(87) PCT Pub. No.: WO2017/073206
PCT Pub. Date: May 4, 2017

(65) Prior Publication Data
US 2018/0297403 A1 Oct. 18, 2018

(30) Foreign Application Priority Data
Oct. 27, 2015 (JP) .............................. JP2015-210682

(51) Int. Cl.
| B60C 1/00 | (2006.01) |
| C08J 3/20 | (2006.01) |
| C08J 3/24 | (2006.01) |
| C08K 5/00 | (2006.01) |
| C08K 5/36 | (2006.01) |
| C08L 9/06 | (2006.01) |
| C08L 21/00 | (2006.01) |

(52) U.S. Cl.
CPC .............. *B60C 1/0016* (2013.01); *B60C 1/00* (2013.01); *C08J 3/20* (2013.01); *C08J 3/24* (2013.01); *C08K 5/0025* (2013.01); *C08K 5/36* (2013.01); *C08L 9/06* (2013.01); *C08L 21/00* (2013.01)

(58) Field of Classification Search
CPC .. B60C 1/0016; B60C 1/00; C08J 3/20; C08J 3/24; C08K 5/0025; C08K 5/36; C08L 9/06; C08L 21/00
See application file for complete search history.

(56) References Cited

U.S. PATENT DOCUMENTS

| 5,580,919 A | 12/1996 | Agostini et al. |
| 5,674,932 A | 10/1997 | Agostini et al. |
| 2005/0096424 A1* | 5/2005 | Otsuji ....................... C08L 9/00 524/496 |
| 2009/0043014 A1 | 2/2009 | Narita et al. |
| 2009/0062455 A1* | 3/2009 | Narita ....................... B60C 1/00 524/571 |
| 2010/0137519 A1* | 6/2010 | Noordermeer ........ B60C 1/0025 525/235 |
| 2011/0003932 A1* | 1/2011 | Steinhauser .......... B60C 1/0016 524/571 |
| 2016/0017135 A1* | 1/2016 | Ran .......................... C08J 3/246 525/192 |
| 2018/0297404 A1* | 10/2018 | Mashita .................. B60C 11/00 |
| 2018/0304683 A1* | 10/2018 | Mashita .................. B60C 11/00 |

FOREIGN PATENT DOCUMENTS

| EP | 0378041 A1 * | 7/1990 |
| EP | 3 255 091 A1 | 12/2017 |
| EP | 3 255 092 A1 | 12/2017 |
| EP | 3 348 424 A1 | 7/2018 |
| EP | 3 348 426 A1 | 7/2018 |
| JP | 01314601 A * | 12/1989 |
| JP | 8-259739 A | 10/1996 |
| JP | 2007-99950 A | 4/2007 |
| JP | 2009-74069 A | 4/2009 |
| JP | 2010-18691 A | 1/2010 |
| JP | 2010-18706 A | 1/2010 |
| JP | 2010-18715 A | 1/2010 |
| JP | 2010-18716 A | 1/2010 |
| JP | 2012-77217 A | 4/2012 |

(Continued)

OTHER PUBLICATIONS

Machine translation of JP2010-018715 (Year: 2020).*
Machine translation of JP2010-018716 (Year: 2020).*
International Search Report for PCT/JP2016/077795 (PCT/ISA/210) dated Dec. 20, 2016.
Written Opinion of the International Searching Authority for PCT/JP2016/077795 (PCT/ISA/237) dated Dec. 20, 2016.
Extended European Search Report dated Feb. 19, 2019, in European Patent Application No. 16859443.0.

(Continued)

*Primary Examiner* — Irina S Zemel
*Assistant Examiner* — Jeffrey S Lenihan
(74) *Attorney, Agent, or Firm* — Birch, Stewart, Kolasch & Birch, LLP

(57) ABSTRACT

Provided are a method for manufacturing a rubber composition for a tire and a method for manufacturing a tire including this manufacturing method for the rubber composition in the present invention, which are characterized by including the steps of: starting to knead a rubber component, a sulfur donor, and a sulfur atom-containing vulcanization accelerator together before kneading the rubber component with a filler; and then adding a filler to an obtained kneaded product and performing kneading at a kneading temperature of 120° C. or higher. According to the manufacturing methods of the present invention, a rubber composition for a tire and a tire which have good fracture property can be manufactured.

8 Claims, No Drawings

(56) References Cited

FOREIGN PATENT DOCUMENTS

| JP | 2013-129761 A | 7/2013 |
| JP | 2014-47323 A | 3/2014 |
| JP | 2014-47327 A | 3/2014 |
| JP | 2014-118555 A | 6/2014 |

OTHER PUBLICATIONS

English translation of International Preliminary Report on Patentability and Written Opinion dated May 11, 2018, in PCT International Application No. PCT/JP2016/077795.

* cited by examiner

METHOD FOR MANUFACTURING RUBBER COMPOSITION FOR TIRE AND METHOD FOR MANUFACTURING TIRE

TECHNICAL FIELD

The present invention relates to a method for manufacturing a rubber composition for a tire and a method for manufacturing a tire.

BACKGROUND OF THE INVENTION

In recent years, social demands for reduction of carbon dioxide gas emissions have been strengthened from the standpoint of resource conservation, energy conservation, and environmental protection, and various countermeasures such as weight reduction, reduction of fuel consumption, and use of electric energy have been studied for automobiles. In such a situation, tires for automobiles are required to reduce their rolling resistance to enhance fuel efficiency performance. Further, tires are also desired to have improved performance such as durability.

For example, as a method of lowering the rolling resistance of a tire, there are known measures, such as adoption of silica compounding, reduction of the amount of filler, use of filler having a small reinforcing property, and the like. However, these measures tend to reduce the mechanical strength or the like of rubber and to deteriorate various performance.

Further, the use of a polysulfide-based silane coupling agent or a mercapto-based silane coupling agent for the silica compounding has been proposed. However, a coupling reaction could progress in a kneading process depending on kneading conditions, which tends to deteriorate the processability of the rubber composition. Even in the silica compounding, it is desired to provide a silica-based rubber composition which has good processability and improves its performance, such as rubber strength and abrasion resistance, with good balance.

For this reason, Patent Documents 1 and 2 describe that the processability, fuel efficiency, rubber strength, abrasion resistance, and crack growth resistance of a rubber composition can be improved in a balanced manner by further compounding a predetermined polysulfide compound into a rubber composition that contains a silica and a silane coupling agent having a mercapto group.

There has been also proposed a method for manufacturing a rubber composition by a kneading method which is not a conventional kneading method that includes a base kneading step X of kneading components other than a vulcanization chemical, such as a vulcanization agent and a vulcanization accelerator, and a finishing kneading step F of adding a vulcanization chemical to the kneaded product obtained in the step X.

For example, Patent Documents 3 and 4 and the like describe that compounding agents, including a rubber component, a filler, a silane coupling agent, and a vulcanization accelerator, are kneaded in the first stage of kneading, thereby producing a rubber composition with less heat generation.

Patent Document 5 describes that a rubber component, a filler, a silane coupling agent, a sulfur donor, and a vulcanization accelerator are kneaded in a pre-mixing step, thereby manufacturing a rubber composition excellent in strength and abrasion resistance.

PRIOR ART DOCUMENT

Patent Document

Patent Document 1: JP 2014-47323 A
Patent Document 2: JP 2014-47327 A
Patent Document 3: JP 2012-77217 A
Patent Document 4: JP 2013-129761 A
Patent Document 5: JP H08-259739 A

SUMMARY OF THE INVENTION

Problems to be Solved by the Invention

In the manufacturing methods described in Patent Documents 3 to 5, since a vulcanization accelerator (and a sulfur donor) is kneaded at the same time or after charging of the filler, dispersion of the vulcanization accelerator is suppressed, thus making it difficult to obtain an effect of improving the fracture property of a rubber composition.

An object of the present invention is to provide a method for manufacturing a rubber composition for a tire which has good fracture property, and a method for manufacturing a tire using the rubber composition.

Means to Solve the Problem

The present invention relates to a method for manufacturing a rubber composition for a tire, comprising the steps of: starting to knead a rubber component, a sulfur donor, and a sulfur atom-containing vulcanization accelerator together before kneading the rubber component with a filler; and then adding a filler to an obtained kneaded product and kneading at a kneading temperature of 120° C. or higher.

It is preferable that after adding the filler to the rubber component and performing kneading at the kneading temperature of 120° C. or higher, a vulcanization agent is further kneaded therein.

It is preferable that the rubber component contains 20% by mass or more of a styrene butadiene rubber in which a vinyl content is 20% or more.

It is preferable that after adding the filler to the rubber component and performing kneading at the kneading temperature of 120° C. or higher, a vulcanization accelerator is added and kneaded to the kneaded product such that a mass ratio of a compounding amount of this vulcanization accelerator to a compounding amount of the sulfur atom-containing vulcanization accelerator is more than 0% and 80% or less.

The present invention relates to a method for manufacturing a tire, comprising the steps of: molding a green tire by fainting a tire member from the rubber composition for a tire obtained in the aforementioned manufacturing method and combining the tire member with other tire members; and vulcanizing the green tire obtained in the molding step.

Effects of the Invention

According to the method for manufacturing a rubber composition for a tire in the present invention, which is characterized by comprising the steps of: starting to knead a rubber component, a sulfur donor, and a sulfur atom-containing vulcanization accelerator together before kneading the rubber component with a filler; and then adding a filler to an obtained kneaded product and performing kneading at a kneading temperature of 120° C. or higher, it is possible to manufacture the rubber composition with good fracture property.

DETAILED DESCRIPTION

A method for manufacturing a rubber composition for a tire according to the present disclosure is characterized by comprising the steps of: starting to knead a rubber component, a sulfur donor, and a sulfur atom-containing vulcanization accelerator together before kneading the rubber component with a filler; and then adding a filler to an obtained kneaded product and performing kneading at a kneading temperature of 120° C. or higher. Each kneading step can be performed by using the well-known kneading machine, such as a Banbury mixer, a kneader, or an open roll, that kneads and mixes a material by applying a mechanical shear force of the machine to the material.

The sulfur donor as used in the present disclosure refers to, for example, an elemental sulfur or a sulfur compound that releases activated sulfur under vulcanization conditions (e.g., 150° C., and 1.5 MPa) or lower temperatures and pressures. In other words, the sulfur compound is a compound that, for example, generally exhibits the function as a vulcanizing agent under vulcanization conditions (e.g., 150° C., 1.5 MPa) or lower temperatures and pressures. It is noted that the released activated sulfur forms a part of a pendant type structure, which will be described later.

The sulfur atom-containing vulcanization accelerator in the present disclosure refers to a vulcanization accelerator containing sulfur atoms that are bonded to other molecules by a single bond. Some of sulfur atom-containing vulcanization accelerators release activated sulfur, while others do not. From the viewpoint of suppressing the progress of a crosslinking reaction during kneading, the sulfur atom-containing vulcanization accelerators that do not release activated sulfur are preferable.

The filler in the present disclosure is a general filler conventionally used in rubber compositions for tires, and examples of the filler include carbon black, silica, clay, talc, calcium carbonate, aluminum hydroxide, short fibers, nanofibers, and the like.

According to the present disclosure, by starting kneading of the rubber component, the sulfur donor, and the sulfur atom-containing vulcanization accelerator together before kneading the rubber component with a filler, adsorption of the sulfur donor and the sulfur atom-containing vulcanization accelerator by the filler can be prevented, so that the sulfur donor and the sulfur atom-containing vulcanization accelerator in the rubber component can be efficiently dispersed. In the present disclosure, the filler is added to the kneaded product obtained by kneading the rubber component, the sulfur donor, and the sulfur atom-containing vulcanization accelerator, and then the kneaded product and a filler are kneaded together at a kneading temperature of 120° C. or higher. Activated sulfur is released from the sulfur donor due to the kneading temperature of 120° C. or higher and the mechanical shear force during kneading. The activated sulfur, the sulfur atom-containing vulcanization accelerator, and the rubber component react with one another to form a pendant type structure in which all or a part of the sulfur atom-containing vulcanization accelerator (hereinafter, referred to as a "vulcanization accelerator residue") is bonded to the rubber component, that is, in which a "—S-vulcanization accelerator residue" is bonded to the rubber component. The mechanism of this reaction is presumed to be that the released activated sulfur reacts with sulfur atoms of the sulfur atom-containing vulcanization accelerator to form a structure in which two or more sulfur atoms are bonded together, and this structure part reacts with a double bond part of the rubber component. By performing kneading in a state in which the pendant-type structure is formed, the vulcanization accelerator residues move together with the rubber component, so that the uniformity of the dispersion state of the vulcanization accelerator residues in the entire rubber composition can be enhanced. Thus, the present disclosure can make the crosslinking density uniform during vulcanization, and as a result, can obtain a rubber composition for a tire having good fracture property. The kneading temperature as used herein refers to an actually measured temperature of the rubber composition in the kneading machine, and can be determined by measuring a surface temperature of the rubber composition with a non-contact type temperature sensor or the like.

As described above, the present disclosure is characterized in that kneading of the rubber component, the sulfur donor, and the sulfur atom-containing vulcanization accelerator is started before kneading the filler therewith, and in that kneading is performed at a kneading temperature of 120° C. or higher after adding the filler. Any material may be added in any step as long as the above-mentioned requirements are satisfied. For example, in a case where the kneading step is a two-step process composed of a step X and a step F, kneading of the rubber component, the sulfur donor, and the sulfur atom-containing vulcanization accelerator may be started at an initial stage of the step X; the filler may be added to a kneaded product at some midpoint of the step X and kneaded at a kneading temperature of 120° C. or higher; and the subsequent step F may be performed. For example, in a case where the kneading step is a three-step process composed of a step X, a step Y, and a step F, kneading of the rubber component, the sulfur donor, and the sulfur atom-containing vulcanization accelerator may be started in the step X, the filler may be added to a kneaded product and kneaded at a kneading temperature of 120° C. or higher in the subsequent step Y, and the subsequent step F may be performed. In another example of the three-step process, kneading of the rubber component, the sulfur donor, and the sulfur atom-containing vulcanization accelerator may be started at an initial stage of the step X; the filler may be added to a kneaded product at some midpoint of the step X and kneaded at a kneading temperature of 120° C. or higher; and the subsequent steps Y and F may be performed. Alternatively, kneading of the rubber component, the sulfur donor, and the sulfur atom-containing vulcanization accelerator may be started at an initial stage of the step X; the filler may be added thereto at some midpoint of the step X; the filler may be further added thereto in the subsequent step Y and kneaded at a kneading temperature of 120° C. or higher; and then the subsequent step F may be performed. It should be noted that a remill may be performed between the respective steps.

The kneading temperature of the rubber component, the sulfur donor, and the sulfur atom-containing vulcanization accelerator is not particularly limited, but is preferably lower than 160° C., and more preferably 150° C. or lower from the viewpoint of suppressing the progress of the crosslinking reaction due to the sulfur donor and the sulfur atom-containing vulcanization accelerator.

The kneading time of the rubber component, the sulfur donor, and the sulfur atom-containing vulcanization accelerator before the addition of the filler to the rubber component is not particularly limited, but is, for example, 10 seconds or more from the viewpoint of improving dispersibility.

The kneading time after the addition of the filler is preferably 170° C. or lower, and more preferably 150° C. or lower from the viewpoint of suppressing the excessive crosslinking reaction.

The kneading time since when the kneading temperature reaches 120° C. after adding the filler to the rubber component is not particularly limited, but is, for example, 2 minutes or more from the viewpoint of improving dispersibility. It is noted that the kneading time as used herein refers to a period of time from when the kneading temperature reaches 120° C. by adding the filler to the rubber component to when the whole processes in the kneading steps are finished. For example, the kneading time corresponds to a period of time from when the kneading temperature reaches 120° C. after adding the filler to the rubber component in the step X to when the step F is completed.

As mentioned above, the present disclosure can use, as the sulfur donor, an elemental sulfur and/or a sulfur compound that releases the aforesaid activated sulfur. Examples of the elemental sulfur include powder sulfur, precipitated sulfur, colloidal sulfur, surface treated sulfur, insoluble sulfur, and the like.

If an excessive amount of elemental sulfur is compounded as the sulfur donor, the vulcanization reaction might progress excessively in the kneading process. Therefore, when an elemental sulfur is used as the sulfur donor, the content of the elemental sulfur is preferably 0.1 part by mass or less based on 100 parts by mass of the rubber component. The content of the elemental sulfur is preferably 0.05 part by mass or more from the viewpoint of fracture strength.

Examples of the sulfur compound that functions as a sulfur donor include a polymer polysulfide represented by —(-M-S—C—)$_n$—, or a compound having a structure of the single bond of two or more sulfur atoms, i.e., —S$_n$-(n≥2) and releasing activated sulfur. Examples of this compound include alkylphenol disulfide, morpholine disulfide, a thiuram-based vulcanization accelerator having —S$_n$-(n≥2) (such as tetramethylthiuram disulfide (TMTD), tetraethylthiuram disulfide (TETD), tetrabutylthiuram disulfide (TBTD), dipentamethylenethiuram tetrasulfide (DPTT) and the like), vulcanization accelerator 2-(4'-morpholinodithio) benzothiazole (MDB), a polysulfide type silane coupling agent (for example, Si69 (bis (3-triethoxysilylpropyl)tetrasulfide) manufactured by Degussa), and sulfide compounds represented by formula (1), (2), or (3) below.

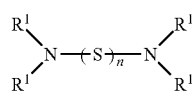
(1)

where R$^1$ represents a monovalent hydrocarbon group with a carbon number of 3 to 15 which may have a substituent, R$^1$s may be the same or different; and n represents an integer of 2 to 6.

In the formula (1), R$^1$ represents a monovalent hydrocarbon group with a carbon number of 3 to 15 which may have a substituent, wherein the carbon number is preferably 5 to 12, and more preferably 6 to 10. The monovalent hydrocarbon group of R$^1$ may be linear, branched, or annular, and may be either a saturated or an unsaturated hydrocarbon group (aliphatic, alicyclic, aromatic hydrocarbon group, etc.). Among these, aromatic hydrocarbon groups which may have substituents are preferred.

R$^1$ is preferably, for example, an alkyl group, a substituted alkyl group, a cycloalkyl group, a substituted cycloalkyl group, an aralkyl group, a substituted aralkyl group, and the like, which have a carbon number of 3 to 15, and among these an aralkyl group and a substituted aralkyl group are preferable. Here, examples of the alkyl group include a butyl group and an octyl group; examples of the cycloalkyl group include a cyclohexyl group; and examples of the aralkyl group include a benzyl group and a phenethyl group. Examples of the substituent include polar groups, such as an oxo group (=O), a hydroxy group, a carboxyl group, a carbonyl group, an amino group, an acetyl group, an amide group, an imide group, and the like.

In the formula (1), n is an integer of 2 to 6, and preferably 2 or 3.

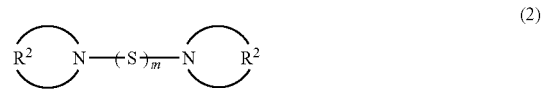
(2)

where R$^2$ represents a divalent hydrocarbon with a carbon number of 3 to 15 which may have a substituent, R$^2$s may be the same or different; and m represents an integer of 2 to 6.

In the formula (2), R$^2$ represents a divalent hydrocarbon group with a carbon number of 3 to 15 which may have a substituent, wherein the carbon number is preferably 3 to 10, and more preferably 4 to 8. The divalent hydrocarbon group of R$^2$ may be linear, branched, or annular, and may be either a saturated or an unsaturated hydrocarbon group (aliphatic, alicyclic, aromatic hydrocarbon group, etc.). Among these, an aliphatic hydrocarbon group which may have a substituent is preferable, and a linear aliphatic hydrocarbon group is more preferable.

R$^2$ is preferably, for example, an alkylene group, a substituted alkylene group and the like which have a carbon number of 3 to 15.

Here, examples of the alkylene group include a butylene group, a pentylene group, a hexylene group, a heptylene group, an octylene group, a nonylene group, and the like. The substituents of R$^2$ can be the same as the substituents of R$^1$.

In the formula (2), m is an integral of 2 to 6, and preferably 2 or 3.

Specific examples of the sulfide compound represented by the above formulas (1) and (2) include N,N'-di(γ-butyrolactam) disulfide, N,N'-di(5-methyl-γ-butyrolactam) disulfide, N,N'-di(5-ethyl-γ-butyrolactam)disulfide, N,N'-di(5-isopropyl-γ-butyrolactam) disulfide, N,N'-di (5-methoxy-γ-butyrolactam) disulfide, N,N'-di(5-ethoxy-γ-butyrolactam) disulfide, N, N'-di(5-chloro-γ-butyrolactam) disulfide, N,N'-di(5-nitro-γ-butyrolactam) disulfide, N,N'-di(5-amino-γ-butyrolactam) disulfide, N,N'-di(δ-valerolactam) disulfide, N,N'-di(δ-caprolactam) disulfide, N,N'-di(ε-caprolactam) disulfide, N,N'-di(3-methyl-δ-caprolactam) disulfide, N,N'-di(3-ethyl-δ-caprolactam) disulfide, N,N'-di(3-isopropyl-ε-caprolactam) disulfide, N,N'-di(δ-methoxy-ε-caprolactam) disulfide, N,N'-di(3-ethoxy-ε-caprolactam) disulfide, N,N'-di(3-chloro-ε-caprolactam) disulfide, N,N'-di(δ-nitro-ε-caprolactam) disulfide, N,N'-di(3-amino-ε-caprolactam) disulfide, N,N'-di(ω-heptalactam) disulfide, N,N'-di(ω-octalactam) disulfide, dithiodicaprolactam, morpholine disulfide, N-benzyl-N-[(dibenzylamino)disulfanyl]phenylmethanamine(N, N'-dithiobis (dibenzylamine)), etc. These sulfide compounds may be used alone or in combination.

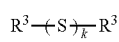  (3)

where $R^3$ represents an alkyl group, a benzothiazolyl group, an amino group, a morpholino group, a dialkylthiocarbamoyl group, or a group represented by formula (4), $R^3$s may be the same or different; and k represents an integer of 2 to 6.

  (4)

where $R^4$ represents an alkyl group, a benzothiazolyl sulfide group, a cycloalkyl group, or a hydrogen atom, $R^4$s may be the same or different.

In the formula (3), $R^3$ represents an alkyl group, a benzothiazolyl group, an amino group, a morpholino group, a dialkylthiocarbamoyl group, or a group represented by formula (4), the $R^3$s are the same or different. Among these, an alkyl group with a carbon number of 1 to 10, a benzothiazolyl group, an amino group, a morpholino group, and a dialkylthiocarbamoyl group (in which the alkyl groups may be the same or different, and each alkyl group is an alkyl group with a carbon number of 1 to 10) are preferable.

Examples of the alkyl group with a carbon number of 1 to 10 and examples of the alkyl groups with a carbon number of 1 to 10 in the above-mentioned dialkylthiocarbamoyl group include a methyl group, an ethyl group, an n-propyl group, an iso-propyl group, an n-butyl group, an iso-butyl group, a sec-butyl group, a tert-butyl group, a pentyl group, a hexyl group, a heptyl group, a 2-ethylhexyl group, an octyl group, a nonyl group, and the like.

In the formula (3), $R^3$ is more preferably a benzothiazolyl group, a morpholino group, or a dialkylthiocarbamoyl group (in which the alkyl groups may be the same or different, and each alkyl group is an alkyl group with a carbon number of 1 to 5), and the $R^3$s may be the same or different. $R^3$ is further preferably a benzothiazolyl group or a dialkylthiocarbamoyl group (in which the alkyl groups may be the same or different, and each alkyl group is an alkyl group with a carbon number of 1 to 5).

In the formula (3), k is an integer of 2 to 6, and further preferably 2 or 3.

In the formula (4), $R^4$ is an alkyl group, a benzothiazolyl sulfide group, a cycloalkyl group, or a hydrogen atom, and the $R^4$s may be the same or different. The alkyl group is preferably an alkyl group with a carbon number of 1 to 10, and the cycloalkyl group is preferably a cycloalkyl group with a carbon number of 5 to 8.

Examples of the sulfide compound represented by the above formula (3) include tetramethylthiuram disulfide, tetraethylthiuram disulfide, tetrabutylthiuram disulfide, 2-(morpholinodithio)benzothiazole, dibenzothiazolyl disulfide, N-cyclohexyl-2-benzothiazolylsulfenamide and the like. In particular, dibenzothiazolyl disulfide is suitably used.

When the sulfur compound functioning as the sulfur donor is used, the content of the sulfur compound is preferably 0.1 part by mass or more, and more preferably 0.2 part by mass or more, based on 100 parts by mass of the rubber component, for the reason of promoting the formation of the pendant type structure. The content of the sulfur compound is preferably 5 parts by mass or less, more preferably 3 parts by mass or less, and further preferably 2 parts by mass or less from the viewpoint of suppressing gelation during kneading.

As the vulcanization accelerator functioning as the sulfur donor, there is a vulcanization accelerator containing sulfur atoms which are bonded to other molecules by a single bond. Therefore, the sulfur atom-containing vulcanization accelerator that functions as the sulfur donor has both the function of the sulfur donor in the present disclosure and the function of the sulfur atom-containing vulcanization accelerator in the present disclosure. Thus, the pendant type structure can be formed even by compounding a large amount of sulfur atom-containing vulcanization accelerators functioning as the sulfur donor alone or by using two or more kinds of sulfur atom-containing vulcanization accelerators. However, if a large amount of sulfur atom-containing vulcanization accelerator functioning as the sulfur donor is compounded, the crosslinking reaction might progress excessively during kneading. Meanwhile, if a small amount of sulfur atom-containing vulcanization accelerator is compounded alone, the effect of making the crosslinking effect uniform might become difficult to achieve. Owing to this, the sulfur donor and sulfur atom-containing vulcanization accelerator which are kneaded before the addition of the filler are preferably the sulfur donor (sulfur atom-containing vulcanization accelerator functioning as a sulfur donor and/or sulfur donor other than this) and a sulfur atom-containing vulcanization accelerator with sulfur non-releasing property.

The sulfur atom-containing vulcanization accelerator with the sulfur non-releasing property refers to a sulfur atom-containing vulcanization accelerator, for example, that does not release activated sulfur under vulcanization conditions (for example, 150° C., 1.5 MPa) or lower temperatures and pressures. In other words, the sulfur atom-containing vulcanization accelerator with the sulfur non-releasing property is a sulfur atom-containing vulcanization accelerator that does not exhibit the function as the vulcanization agent, for example, under the vulcanization conditions (for example, 150° C., 1.5 MPa) or lower temperatures and pressures.

Examples of the sulfur atom-containing vulcanization accelerator with the sulfur non-releasing property include a thiazole-based vulcanization accelerator having no $—S_n—$ (n≥2) (2-mercaptobenzothiazole (MBT), a zinc salt of 2-mercaptobenzothiazole (ZnMBT), a cyclohexylamine salt of 2-mercaptobenzothiazole (CMBT), etc.); sulfenamide-based vulcanization accelerator (N-cyclohexyl-2-benzothiazolylsulfenamide (CBS), N-(tert-butyl)-2-benzothiazole sulfenamide (TBBS), N,N-dicyclohexyl-2-benzothiazolylsulfenamide, etc.); a vulcanization accelerator of a tetramethylthiuram monosulfide (TMTM); a dithiocarbamate-based vulcanization accelerator (piperidinium pentamethylene dithiocarbamate (PPDC), zinc dimethyldithiocarbamate (ZnMDC), zinc diethyl dithiocarbamate (ZnEDC), zinc dibutyldithiocarbamate (ZnBDC), zinc N-ethyl-N-phenyl dithiocarbamate (ZnEPDC), zinc N-pentamethylenedithiocarbamate (ZnPDC), sodium dibutyldithiocarbamate (NaBDC), copper dimethyldithiocarbamate (CuMDC), iron dimethyldithiocarbamate (FeMDC), tellurium diethyldithiocarbamate (TeEDC), etc.); and the like. It should be noted that although di-2-benzothiazolyl disulfide (MBTS) which is a thiazole-based vulcanization accelerator has $—S_n—$ (n≥2) and is a vulcanization accelerator that releases sulfur, it does not exhibit the function in a general compounding amount as the vulcanization agent for natural rubber or butadiene rubber. Thus, the MBTS can be used in the same manner as the sulfur atom-containing vulcanization accelerator with the sulfur non-releasing property.

The content of the sulfur atom-containing vulcanization accelerator is preferably 1.0 part by mass or more, and more preferably 1.5 parts by mass or more, based on 100 parts by mass of the rubber component, because a vulcanization reaction proceeds efficiently in a vulcanization step. The content of the sulfur atom-containing vulcanization accelerator is preferably 5 parts by mass or less, and more preferably 3 parts by mass or less from the viewpoint of the scorch property and suppression of precipitation on the surface.

The rubber component in the present disclosure is not limited particularly, and a rubber component conventionally used in a rubber composition for a tire can be used. Examples of the rubber component include diene-based rubbers such as isoprene-based rubbers including natural rubber and polyisoprene rubber (IR), butadiene rubber (BR), styrene butadiene rubber (SBR), styrene isoprene butadiene rubber (SIBR), chloroprene rubber (CR), acrylonitrile butadiene rubber (NBR); and butyl-based rubbers. These rubber components can be used alone and in combination. Among them, natural rubber, SBR, and BR are preferably contained from the viewpoint of the balance among fuel efficiency, abrasion resistance, durability, and wet grip performance.

Examples of the natural rubber include natural rubber (NR), and modified natural rubbers such as epoxy natural rubber (ENR), hydrogenated natural rubber (HNR), deprotein natural rubber (DPNR), high-purity natural rubber (UPNR), and the like.

Examples of the SBR include an unmodified solution polymerized SBR (S-SBR), an unmodified emulsion polymerized SBR (E-SBR), and a modified SBR thereof (modified S-SBR, modified E-SBR). Modified SBRs include modified SBR with the terminal and/or main chain thereof modified, modified SBR coupled with a tin compound, a silicon compound, or the like (a condensate, and one having branched structures), and the like.

The vinyl content in the SBR is preferably 20% or more, and more preferably 30% or more, because the pendant-type structure of "—S-vulcanization accelerator residue" can be sufficiently formed, and a rubber composition for a tire having good fracture property can be obtained. The upper limit of the vinyl content in the SBR is not particularly limited, and is, for example, 70% or less. The vinyl content in the SBR as used herein refers to a vinyl content in a butadiene portion, and is a value calculated by $^1$H-NMR measurement.

The styrene content in the SBR is preferably 5% by mass or more, more preferably 10% by mass or more, and further preferably 20% by mass or more from the viewpoint of dry grip performance, wet grip performance, and rubber strength. The styrene content in the SBR is preferably 60% by mass or less, more preferably 50% by mass or less, and more preferably 40% by mass or less from the viewpoint of fuel efficiency. The styrene content in the SBR as used herein is a value calculated by $^1$H-NMR measurement.

The content of SBR with a vinyl content of 20% or more in the rubber component is preferably 8% by mass or more, more preferably 20% by mass or more, and further preferably 30% by mass or more, because the effect of the present disclosure is further improved. The content of SBR is preferably 90% by mass or less, more preferably 85% by mass or less, and further preferably 80% by mass or less from the viewpoint of abrasion resistance and crack growth resistance.

The BR may include high-cis BR having a cis content of 90% or more, modified BR with the terminal and/or main chain thereof modified, modified BR coupled with a tin compound, a silicon compound (a condensate, one having a branched structure) and the like. Among these BRs, the high-cis BR is preferable because of its good abrasion resistance.

In the case of containing BR, the content of BR in the rubber component is preferably 1% by mass or more, more preferably 5% by mass or more, and further preferably 10% by mass or more from the viewpoint of abrasion resistance. The content of BR is preferably 80% by mass or less, more preferably 75% by mass or less, and more preferably 70% by mass or less from the viewpoint of processability.

As described above, the filler in the present disclosure is not particularly limited, and a carbon black or an inorganic filler conventionally used for a rubber composition for a tire can be used.

The carbon black is not particularly limited, and any carbon black that can be used in the tire industry, such as GPF, FEF, HAF, ISAF, and SAF, can be used. These carbon blacks may be used alone or in combination.

The nitrogen adsorption specific surface area ($N_2SA$) of the carbon black is preferably 80 m$^2$/g or more, and more preferably 90 m$^2$/g or more from the viewpoint of weather resistance and reinforcing property. The $N_2SA$ of the carbon black (C) is preferably 400 m$^2$/g or less, more preferably 300 m$^2$/g or less, and more preferably 250 m$^2$/g or less, from the viewpoint of fuel efficiency, dispersibility, fracture property, and durability. The $N_2SA$ of the carbon black as used herein is measured according to the method A of JIS K6217.

The dibutyl phthalate (DBP) oil absorption amount of the carbon black is preferably 60 ml/100 g or more, and more preferably 80 ml/100 g or more from the viewpoint of reinforcing property and durability. The dibutyl phthalate (DBP) oil absorption amount of the carbon black is preferably 300 ml/100 g or less, more preferably 200 ml/100 g or less, and further preferably 150 ml/100 g or less from the viewpoint of durability and fatigue property.

In the case of containing carbon black, the content of carbon black in the rubber component is preferably 3 parts by mass or more and more preferably 5 parts by mass or more based on 100 parts by mass of the rubber component from the viewpoint of weather resistance. The content of carbon black is preferably 100 parts by mass or less, more preferably 80 parts by mass or less, and more preferably 60 parts by mass or less from the viewpoint of fuel efficiency and processability.

Examples of the inorganic filler include silica, aluminum hydroxide, alumina (aluminum oxide), calcium carbonate, talc, clay, and the like, and these inorganic fillers can be used alone or in combination.

Silica is preferred because of its good abrasion resistance, durability, wet grip performance, and fuel efficiency.

Examples of the silica include dry silica (anhydrous silica) and wet silica (water-containing silica). Among them, wet silica is preferable because it has a large amount of silanol groups. These types of silica may be used alone or in combination.

The nitrogen adsorption specific surface area ($N_2SA$) of silica is preferably 20 m$^2$/g or more, more preferably 30 m$^2$/g or more, and further preferably 100 m$^2$/g or more. Further, the upper limit of the $N_2SA$ is preferably 400 m$^2$/g or less, more preferably 300 m$^2$/g or less, and further 280 m²/g or less. By using silica having N₂SA within the above-mentioned range, the adequate fuel efficiency and processability can be obtained with good balance. It is noted that the N₂SA of silica is a value measured by a BET method according to ASTM D3037-81.

In the case of containing silica, the content of silica in the rubber component is preferably 10 parts by mass or more, and more preferably 15 parts by mass or more based on 100 parts by mass of the rubber component from the viewpoint of fuel efficiency. The content of silica is preferably 120 parts by mass or less, more preferably 90 parts by mass or less, and more preferably 80 parts by mass or less from the viewpoint of dispersibility, processability, and fuel efficiency performance of silica.

The silica is preferably used in combination with a silane coupling agent. As the silane coupling agent, any silane coupling agent conventionally used in combination with silica in the rubber industry can be used. Examples of the silane coupling agent include sulfide-based silane coupling agents such as bis(3-triethoxysilylpropyl) disulfide, bis(3-triethoxysilylpropyl)tetrasulfide; mercapto-based silane coupling agents (silane coupling agents having a mercapto group) such as 3-mercaptopropyltrimethoxysilane, NXT-Z 100, NXT-Z45, NXT, etc., manufactured by Momentive Performance Materials Inc.; vinyl-based silane coupling agents such as vinyl triethoxysilane; amino-based silane coupling agents such as 3-aminopropyl triethoxysilane; glycidoxy-based silane coupling agents such as γ-glycidoxy-propyltriethoxysilane; nitro-based silane coupling agents such as 3-nitropropyltrimethoxysilane; chloro-based silane coupling agents such as 3-chloropropyltrimethoxysilane; and the like. These silane coupling agents may be used alone or in combination. Among them, sulfide-based silane coupling agents and mercapto-based silane coupling agents are preferable from the viewpoint of strong bonding strength with silica and good fuel efficiency property. Further, the use of the mercapto-based silane coupling agents is preferable from the viewpoint of suitably improving the fuel efficiency property and the abrasion resistance.

In the case of containing a silane coupling agent, the content of the silane coupling agent is preferably 4.0 parts by mass or more, and more preferably 6.0 parts by mass or more based on 100 parts by mass of silica, because an effect of sufficiently improving filler dispersibility, an effect of reducing viscosity, and the like can be obtained. The content of the silane coupling agent is preferably 12 parts by mass or less, and more preferably 10 parts by mass or less, because the sufficient coupling effect and silica dispersion effect are not obtained and the reinforcing property is deteriorated.

When kneading the rubber composition for a tire of the present disclosure, it is preferable to add the filler to the rubber component and knead the rubber component and the filler together at a kneading temperature of 120° C. or higher, and then knead the additional sulfur donor. The addition of the additional sulfur donor can cause the crosslinking reaction to proceed sufficiently during vulcanization while inhibiting the crosslinking reaction from proceeding excessively during kneading.

The additional sulfur donor is added, for example, in step F after addition of the filler to the rubber component and kneading at a kneading temperature of 120° C. or more. The additional sulfur donor may be of the same type as that kneaded prior to the addition of the filler to the rubber component, or may be of a different type, including, for example, an elemental sulfur such as powdered sulfur, precipitated sulfur, colloidal sulfur, surface treated sulfur, or insoluble sulfur.

Although the content of the additional sulfur donor is not particularly limited, for the reason that the vulcanization reaction proceeds efficiently in the vulcanization step, 0.5 part by mass or more is preferable for 100 parts by mass of the rubber component, and more preferably 0.8 part by mass or more. The content of the additional sulfur donor is preferably 3.0 parts by mass or less, and more preferably 2.5 parts by mass or less, because of its good abrasion resistance.

When adding the additional sulfur donor in the above-mentioned step F, a general vulcanization accelerator may be added. Examples of general vulcanization accelerators include sulfur atom-containing vulcanization accelerators, such as thiuram-based disulfides and polysulfides; vulcanization accelerators that do not contain sulfur atoms, such as guanidine-based, aldehyde-amine-based, aldehyde-ammonia-based, and imidazoline-based vulcanization accelerators; and the like.

The content of a vulcanization accelerator added in the step F is preferably 0.1 part by mass or more based on 100 parts by mass of the rubber component. In addition, the mass ratio of the compounding amount of the vulcanization accelerator added in the step F to the compounding amount of the sulfur atom-containing vulcanization accelerator to be kneaded before adding the filler to the rubber component is preferably more than 0% and 80% or less, and further preferably 60% or less. By setting the mass ratio at 80% or less, the rubber composition with good scorch property, fracture property, and abrasion resistance can be obtained.

The rubber composition for a tire according to the present disclosure can be appropriately compounded with, in addition to the above components, compounding agents conventionally used in the rubber industry, for example, plasticizers, anti-aging agents, antioxidants, stearic acids, waxes, and the like.

The rubber composition for a tire of the present disclosure can be used for respective tire members such as treads, undertreads, carcass, sidewalls, beads, and the like of tires. In particular, because of good fracture property, the rubber composition according to the present disclosure is preferably used in a tread included in a tire.

The tire manufacturing method of the present disclosure is a tire manufacturing method that includes a molding step and a vulcanization step. In the molding step, the rubber composition for a tire manufactured by the manufacturing method of the present disclosure is extruded along the shape of a tire member, such as a tread of a tire, to form an extruded material in an unvulcanization stage, and then the extruded material is laminated with other tire members on a tire molding machine and molded by a normal method to form an unvulcanized tire. In the vulcanization step, the obtained unvulcanized tire is heated and pressurized with a vulcanizer. The vulcanization temperature is, for example, 120° C. or higher and 200° C. or lower. The tire according to the present disclosure may be applied to either pneumatic tires or non-pneumatic tires. The pneumatic tires can be suitably used as tires for passenger cars, trucks, buses, and two-wheeled vehicles, high-performance tires, and the like. The high-performance tire as used herein refers to a tire particularly good in grip performance, and implies the concept of racing tires used in racing vehicles.

EXAMPLES

The present disclosure will be described on the basis of Examples, but the present disclosure is not limited only to these Examples.

Hereinafter, various chemicals used in Examples and Comparative Examples will be collectively described.

SBR(1): Buna VSL 4720 manufactured by Lanxess K.K. (S-SBR, styrene content: 17.5 to 21.5% by mass, vinyl content: 44.5 to 50.5%)

SBR(2): Nipol 1502 manufactured by ZEON Corporation (E-SBR, styrene content: 23.5% by mass, vinyl content: less than 20%)

BR: BR150B manufactured by Ube Industries, Ltd. (high-cis BR, cis-1,4 bond content: 96%) Silica: ULTRASIL VN3 ($N_2SA$:175 m$^2$/g) manufactured by Evonik Degussa GmbH Silane coupling agent (1): Si266 (bis(3-triethoxysilylpropyl) disulfide) manufactured by Evonik Degussa GmbH Silane coupling agent (2): NXT (mercapto based) manufactured by Momentive Performance Materials Silane coupling agent (3): NXT-Z45 (mercapto based) manufactured by Momentive Performance Materials Carbon Black: Diablack I ($N_2SA$:98 m$^2$/g, DBP oil absorption amount: 124 ml/100 g) manufactured by Mitsubishi Chemical Co., Ltd.

Zinc oxide: zinc oxide #2 manufactured by Mitsui Mining & Smelting Co., Ltd Stearic acid: bead stearic acid "TSUBAKI" manufactured by NOF Corp.

Antiaging agent: ozonone 6C(N-(1,3-dimethylbutyl)-N-phenyl-p-phenylenediamine, 6PPD) manufactured by Seiko Chemical Co., Ltd.

Oil: Diana Process AH-24 manufactured by Idemitsu Kosan Co., Ltd. Elementary sulfur: powdered sulfur manufactured by Tsurumi Chemical Industry Co., Ltd.

Vulcanization accelerator (1): Nocceler NS (TBBS, N-t-butyl-2-benzothiazolylsulfenamide) manufactured by Ouchi Shinko Chemical Industrial Co., Ltd.

Vulcanization accelerator (2): Nocceler D (DPG, 1,3-diphenylguanidine) manufactured by Ouchi Shinko Chemical Industrial Co., Ltd.

Vulcanization accelerator (3): Nocceler CZ (CBS, N-cyclohexyl-2-benzothiazolylsulfenamide) manufactured by Ouchi Shinko Chemical Industrial Co., Ltd.

Vulcanization accelerator (4): Nocceler M-P (MBT, 2-mercaptobenzothiazole) manufactured by Ouchi Shinko Chemical Industrial Co., Ltd.

Vulcanization accelerator (5): Nocceler PPD (PPDC, piperidinium pentamethylene dithiocarbamate) manufactured by Ouchi Shinko Chemical Industrial Co., Ltd.

Sulfur donor (1): Renograne CLD 80 (caprolactam disulfide) manufactured by Rhein Chemie Sulfer Sulfur donor (2): Nocceler TRA (dipentamethylenethiuram tetrasulfide) manufactured by Ouchi Shinko Chemical Industrial Co., Ltd.

Examples 1 to 13 and Comparative Examples 1 to 18

According to the compounding formulations shown in Tables 1 to 9, various chemicals shown for step X1 were kneaded with a 1.7 L banbury mixer for 20 seconds. The maximum value of the actually measured temperature of the rubber composition during kneading at this time was as shown in X1 of Tables 1 to 9. Thereafter, various chemicals shown for step X2 were added and kneaded for 3 minutes. The maximum value of the actually measured temperature of the rubber composition during kneading at this time was as shown in X2 of Tables 1 to 9. After completion of the step X2, the rubber composition was discharged. The kneaded product obtained in step X2 and various chemicals shown for step F were kneaded together with an open roll for 80° C. for three minutes, thereby producing an unvulcanized rubber composition. The obtained unvulcanized rubber composition was press-vulcanized at 160° C. for 35 minutes to manufacture a vulcanized rubber composition for a test. The obtained vulcanized rubber composition for a test was evaluated as follows. The evaluation results are shown in Tables 1 to 9.

Examples 14 to 17 and Comparative Examples 19 to 30

According to the compounding formulations shown in Tables 10 to 13, various chemicals shown for step X were kneaded with a 1.7 L banbury mixer for one minute. The maximum value of the actually measured temperature of the rubber composition during kneading at this time was as shown in X of Tables 10 to 13. After completion of the step X, the rubber composition was discharged. The kneaded product obtained in step X and various chemicals shown for step Y, which was added to the kneaded product, were kneaded for three minutes. The maximum value of the actually measured temperature of the rubber composition during kneading at this time was as shown in Y of Tables 10 to 13. After completion of the step Y, the rubber composition was discharged. The kneaded product obtained in step Y and various chemicals shown for step F were kneaded together by using an open roll for 80° C. for three minutes, thereby producing an unvulcanized rubber composition. The obtained unvulcanized rubber composition was press-vulcanized at 160° C. for 35 minutes to manufacture a vulcanized rubber composition for a test. The obtained vulcanized rubber composition for a test was evaluated as follows. The evaluation results are shown in Tables 10 to 13.

Fracture Property

A tensile strength and an elongation at break of the vulcanized rubber compositions for tests were measured according to the JIS K6251 "Determination of vulcanized rubber and thermoplastic rubber-tensile properties". Then, a fracture energy was calculated by tensile strength×elongation at break/2, whereby a fracture property index of each compounded rubber composition was expressed assuming that a fracture energy index of a reference example was 100. It shows that the larger the index is, the better the rubber strength becomes.

(Fracture property index)=(fracture energy of each compounding)/(fracture energy in reference example)×100.

Here, in Table 1, Comparative Example 1 is a reference example; in Table 2, Example 4 is a reference example; in Table 3, Example 6 is a reference example; in Table 4, Example 8 is a reference example; in Table 5, Comparative Example 4 is a reference example; in Table 6, Comparative Example 7 is a reference example; in Table 7, Comparative Example 10 is a reference example; in Table 8, Comparative Example 13 is a reference example; in Table 9, Comparative Example 16 is a reference example; in Table 10, Comparative Example 19 is a reference example; in Table 11, Comparative Example 22 is a reference example; in Table 12, Comparative Example 25 is a reference example; and in Table 13, Comparative Example 28 is a reference example.

TABLE 1

|  | Example | | Comparative Example | | |
|---|---|---|---|---|---|
|  | 1 | 2 | 1 | 2 | 3 |
| Compounding amount (parts by mass) | | | | | |
| Step X1 | | | | | |
| SBR (1) | 70 | — | 70 | 70 | 70 |
| SBR (2) | — | 70 | — | — | — |
| BR | 30 | 30 | 30 | 30 | 30 |
| Vulcanization accelerator (1) | 2 | 2 | — | — | 2 |
| Sulfur donor (1) | 1.7 | 1.7 | — | — | 1.7 |
| Kneading temperature (° C.) | 80 | 80 | 80 | 80 | 80 |
| Step X2 | | | | | |
| Silica | 60 | 60 | 60 | 60 | 60 |
| Silane coupling agent (1) | 5 | 5 | 5 | 5 | 5 |
| Carbon black | 10 | 10 | 10 | 10 | 10 |
| Oil | 10 | 10 | 10 | 10 | 10 |
| Zinc Oxide | 5 | 5 | 5 | 5 | 5 |
| Stearic acid | 3 | 3 | 3 | 3 | 3 |
| Anti-aging agent | 2 | 2 | 2 | 2 | 2 |
| Kneading temperature (° C.) | 140 | 140 | 110 | 140 | 110 |
| Step F | | | | | |
| Elementary sulfur | 1.5 | 1.5 | 2 | 2 | 1.5 |
| Vulcanization accelerator (1) | — | — | 2 | 2 | — |
| Vulcanization accelerator (2) | 0.1 | 0.1 | 2 | 2 | 0.1 |
| Evaluation | | | | | |
| Fracture property | 155 | 142 | 100 | 114 | 114 |

TABLE 2

|  | Example | |
|---|---|---|
|  | 3 | 4 |
| Compounding amount (parts by mass) | | |
| Step X1 | | |
| SBR (1) | 50 | — |
| SBR (2) | — | 50 |
| BR | 50 | 50 |
| Vulcanization accelerator (1) | 2 | 2 |
| Sulfur donor (1) | 1.5 | 1.5 |
| Kneading temperature (° C.) | 80 | 80 |
| Step X2 | | |
| Silica | 60 | 60 |
| Silane coupling agent (1) | 5 | 5 |
| Carbon black | 10 | 10 |
| Oil | 10 | 10 |
| Zinc Oxide | 5 | 5 |
| Stearic acid | 3 | 3 |
| Anti-aging agent | 2 | 2 |
| Kneading temperature (° C.) | 140 | 140 |
| Step F | | |
| Elementary sulfur | 1.6 | 1.6 |
| Vulcanization accelerator (1) | — | — |
| Vulcanization accelerator (2) | 0.2 | 0.2 |
| Evaluation | | |
| Fracture property | 107 | 100 |

TABLE 3

|  | Example | |
|---|---|---|
|  | 5 | 6 |
| Compounding amount (parts by mass) | | |
| Step X1 | | |
| SBR (1) | 30 | — |
| SBR (2) | — | 30 |
| BR | 70 | 70 |
| Vulcanization accelerator (1) | 2 | 2 |
| Sulfur donor (1) | 1.2 | 1.2 |
| Kneading temperature (° C.) | 80 | 80 |
| Step X2 | | |
| Silica | 60 | 60 |
| Silane coupling agent (1) | 5 | 5 |
| Carbon black | 10 | 10 |
| Oil | 10 | 10 |
| Zinc Oxide | 5 | 5 |
| Stearic acid | 3 | 3 |
| Anti-aging agent | 2 | 2 |
| Kneading temperature (° C.) | 140 | 140 |
| Step F | | |
| Elementary sulfur | 1.5 | 1.5 |
| Vulcanization accelerator (1) | — | — |
| Vulcanization accelerator (2) | — | — |
| Evaluation | | |
| Fracture property | 103 | 100 |

TABLE 4

|  | Example | |
|---|---|---|
|  | 7 | 8 |
| Compounding amount (parts by mass) | | |
| Step X1 | | |
| SBR (1) | 10 | — |
| SBR (2) | — | 10 |
| BR | 90 | 90 |
| Vulcanization accelerator (1) | 2 | 2 |
| Sulfur donor (1) | 1 | 1 |
| Kneading temperature (° C.) | 80 | 80 |
| Step X2 | | |
| Silica | 60 | 60 |
| Silane coupling agent (1) | 5 | 5 |
| Carbon black | 10 | 10 |
| Oil | 10 | 10 |
| Zinc Oxide | 5 | 5 |
| Stearic acid | 3 | 3 |
| Anti-aging agent | 2 | 2 |
| Kneading temperature (° C.) | 140 | 140 |
| Step F | | |
| Elementary sulfur | 1.5 | 1.5 |
| Vulcanization accelerator (1) | — | — |
| Vulcanization accelerator (2) | — | — |
| Evaluation | | |
| Fracture property | 101 | 100 |

TABLE 5

| | Example | Comparative Example | | |
|---|---|---|---|---|
| | 9 | 4 | 5 | 6 |
| Compounding amount (parts by mass) | | | | |
| Step X1 | | | | |
| SBR (1) | 80 | 80 | 80 | 80 |
| BR | 20 | 20 | 20 | 20 |
| Vulcanization accelerator (1) | 2 | — | — | 2 |
| Sulfur donor (1) | 1.7 | — | — | 1.7 |
| Kneading temperature (° C.) | 80 | 80 | 80 | 80 |
| Step X2 | | | | |
| Silica | 60 | 60 | 60 | 60 |
| Silane coupling agent (2) | 6 | 6 | 6 | 6 |
| Carbon black | 10 | 10 | 10 | 10 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 140 | 110 | 140 | 110 |
| Step F | | | | |
| Elementary sulfur | 1.5 | 2 | 2 | 1.5 |
| Vulcanization accelerator (1) | — | 2 | 2 | — |
| Vulcanization accelerator (2) | 0.4 | 2 | 2 | 0.4 |
| Evaluation | | | | |
| Fracture property | 149 | 100 | 114 | 113 |

TABLE 6

| | Example | Comparative Example | | |
|---|---|---|---|---|
| | 10 | 7 | 8 | 9 |
| Compounding amount (parts by mass) | | | | |
| Step X1 | | | | |
| SBR (1) | 70 | 70 | 70 | 70 |
| BR | 30 | 30 | 30 | 30 |
| Vulcanization accelerator (1) | 2 | — | — | 2 |
| Sulfur donor (1) | 1.7 | — | — | 1.7 |
| Kneading temperature (° C.) | 80 | 80 | 80 | 80 |
| Step X2 | | | | |
| Silica | 60 | 60 | 60 | 60 |
| Silane coupling agent (3) | 5 | 5 | 5 | 5 |
| Carbon black | 10 | 10 | 10 | 10 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 120 | 110 | 120 | 110 |
| Step F | | | | |
| Elementary sulfur | 1.5 | 2 | 2 | 1.5 |
| Vulcanization accelerator (1) | — | 2 | 2 | — |
| Vulcanization accelerator (2) | 0.1 | 2 | 2 | 0.1 |
| Evaluation | | | | |
| Fracture property | 152 | 100 | 110 | 110 |

TABLE 7

| | Example | Comparative Example | | |
|---|---|---|---|---|
| | 11 | 10 | 11 | 12 |
| Compounding amount (parts by mass) | | | | |
| Step X1 | | | | |
| SBR (1) | 65 | 65 | 65 | 65 |
| BR | 35 | 35 | 35 | 35 |
| Vulcanization accelerator (3) | 2 | — | — | 2 |
| Sulfur donor (2) | 1.5 | — | — | 1.5 |
| Kneading temperature (° C.) | 80 | 80 | 80 | 80 |
| Step X2 | | | | |
| Silica | 60 | 60 | 60 | 60 |
| Silane coupling agent (1) | 5 | 5 | 5 | 5 |
| Carbon black | 10 | 10 | 10 | 10 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 140 | 110 | 140 | 110 |
| Step F | | | | |
| Elementary sulfur | 1.5 | 2 | 2 | 1.5 |
| Vulcanization accelerator (3) | — | 2 | 2 | — |
| Vulcanization accelerator (2) | 0.1 | 2 | 2 | 0.1 |
| Evaluation | | | | |
| Fracture property | 148 | 100 | 115 | 113 |

TABLE 8

| | Example | Comparative Example | | |
|---|---|---|---|---|
| | 12 | 13 | 14 | 15 |
| Compounding amount (parts by mass) | | | | |
| Step X1 | | | | |
| SBR (1) | 60 | 60 | 60 | 60 |
| BR | 40 | 40 | 40 | 40 |
| Vulcanization accelerator (4) | 1.7 | — | — | 1.7 |
| Sulfur donor (1) | 1.5 | — | — | 1.5 |
| Kneading temperature (° C.) | 80 | 80 | 80 | 80 |
| Step X2 | | | | |
| Silica | 60 | 60 | 60 | 60 |
| Silane coupling agent (1) | 5 | 5 | 5 | 5 |
| Carbon black | 10 | 10 | 10 | 10 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 140 | 110 | 140 | 110 |
| Step F | | | | |
| Elementary sulfur | 1.2 | 2 | 2 | 1.2 |
| Vulcanization accelerator (4) | — | 1.7 | 1.7 | — |
| Vulcanization accelerator (2) | 0.1 | 2 | 2 | 0.1 |
| Evaluation | | | | |
| Fracture property | 136 | 100 | 111 | 111 |

TABLE 9

|  | Example | Comparative Example | | |
|---|---|---|---|---|
|  | 13 | 16 | 17 | 18 |
| Compounding amount (parts by mass) | | | | |
| Step X1 | | | | |
| SBR (1) | 75 | 75 | 75 | 75 |
| BR | 25 | 25 | 25 | 25 |
| Vulcanization accelerator (5) | 1.2 | — | — | 1.2 |
| Sulfur donor (2) | 1.2 | — | — | 1.2 |
| Kneading temperature (° C.) | 80 | 80 | 80 | 80 |
| Step X2 | | | | |
| Silica | 60 | 60 | 60 | 60 |
| Silane coupling agent (1) | 5 | 5 | 5 | 5 |
| Carbon black | 10 | 10 | 10 | 10 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 140 | 110 | 140 | 110 |
| Step F | | | | |
| Elementary sulfur | 1.4 | 2 | 2 | 1.4 |
| Vulcanization accelerator (5) | — | 1.2 | 1.2 | — |
| Vulcanization accelerator (2) | — | 2 | 2 | — |
| Evaluation | | | | |
| Fracture property | 137 | 100 | 118 | 116 |

TABLE 10

|  | Example | Comparative Example | | |
|---|---|---|---|---|
|  | 14 | 19 | 20 | 21 |
| Compounding amount (parts by mass) | | | | |
| Step X | | | | |
| SBR (1) | 70 | 70 | 70 | 70 |
| BR | 30 | 30 | 30 | 30 |
| Vulcanization accelerator (1) | 2 | — | — | 2 |
| Sulfur donor (1) | 2 | — | — | 2 |
| Kneading temperature (° C.) | 110 | 110 | 110 | 110 |
| Step Y | | | | |
| Silica | 70 | 70 | 70 | 70 |
| Silane coupling agent (1) | 6 | 6 | 6 | 6 |
| Carbon black | 5 | 5 | 5 | 5 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 140 | 110 | 140 | 110 |
| Step F | | | | |
| Elementary sulfur | 1.2 | 2 | 2 | 1.2 |
| Vulcanization accelerator (1) | — | 2 | 2 | — |
| Vulcanization accelerator (2) | 0.3 | 2 | 2 | 0.4 |
| Evaluation | | | | |
| Fracture property | 158 | 100 | 116 | 113 |

TABLE 11

|  | Example | Comparative Example | | |
|---|---|---|---|---|
|  | 15 | 22 | 23 | 24 |
| Compounding amount (parts by mass) | | | | |
| Step X | | | | |
| SBR (1) | 65 | 65 | 65 | 65 |
| BR | 35 | 35 | 35 | 35 |
| Vulcanization accelerator (3) | 2 | — | — | 2 |
| Sulfur donor (2) | 1.5 | — | — | 1.5 |
| Kneading temperature (° C.) | 110 | 110 | 110 | 110 |
| Step Y | | | | |
| Silica | 70 | 70 | 70 | 70 |
| Silane coupling agent (1) | 6 | 6 | 6 | 6 |
| Carbon black | 5 | 5 | 5 | 5 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 140 | 110 | 140 | 110 |
| Step F | | | | |
| Elementary sulfur | 1.5 | 2 | 2 | 1.5 |
| Vulcanization accelerator (3) | — | 2 | 2 | — |
| Vulcanization accelerator (2) | 0.2 | 2 | 2 | 0.2 |
| Evaluation | | | | |
| Fracture property | 162 | 100 | 117 | 115 |

TABLE 12

|  | Example | Comparative Example | | |
|---|---|---|---|---|
|  | 16 | 25 | 26 | 27 |
| Compounding amount (parts by mass) | | | | |
| Step X | | | | |
| SBR (1) | 60 | 60 | 60 | 60 |
| BR | 40 | 40 | 40 | 40 |
| Vulcanization accelerator (4) | 1.6 | — | — | 1.6 |
| Sulfur donor (1) | 1.2 | — | — | 1.2 |
| Kneading temperature (° C.) | 110 | 110 | 110 | 110 |
| Step Y | | | | |
| Silica | 70 | 70 | 70 | 70 |
| Silane coupling agent (1) | 6 | 6 | 6 | 6 |
| Carbon black | 5 | 5 | 5 | 5 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 140 | 110 | 140 | 110 |
| Step F | | | | |
| Elementary sulfur | 1.5 | 2 | 2 | 1.5 |
| Vulcanization accelerator (4) | — | 1.6 | 1.6 | — |
| Vulcanization accelerator (2) | 0.1 | 1.7 | 1.7 | 0.2 |
| Evaluation | | | | |
| Fracture property | 147 | 100 | 115 | 115 |

TABLE 13

|  | Example | Comparative Example | | |
|---|---|---|---|---|
|  | 17 | 28 | 29 | 30 |
| Compounding amount (parts by mass) | | | | |
| Step X | | | | |
| SBR (1) | 75 | 75 | 75 | 75 |
| BR | 25 | 25 | 25 | 25 |
| Vulcanization accelerator (5) | 1.2 | — | — | 1.2 |
| Sulfur donor (2) | 1.1 | — | — | 1.1 |
| Kneading temperature (° C.) | 110 | 110 | 110 | 110 |
| Step Y | | | | |
| Silica | 70 | 70 | 70 | 70 |
| Silane coupling agent (1) | 6 | 6 | 6 | 6 |
| Carbon black | 5 | 5 | 5 | 5 |
| Oil | 10 | 10 | 10 | 10 |
| Zinc Oxide | 5 | 5 | 5 | 5 |
| Stearic acid | 3 | 3 | 3 | 3 |
| Anti-aging agent | 2 | 2 | 2 | 2 |
| Kneading temperature (° C.) | 140 | 110 | 140 | 110 |
| Step F | | | | |
| Elementary sulfur | 1.4 | 2 | 2 | 1.4 |
| Vulcanization accelerator (5) | — | 2 | 2 | — |
| Vulcanization accelerator (2) | — | 2 | 2 | — |
| Evaluation | | | | |
| Fracture property | 141 | 100 | 116 | 113 |

As can be seen from the results of Tables 1 to 13, according to the method for manufacturing a rubber composition of the present disclosure, in which kneading of the rubber component, the sulfur donor, and the sulfur atom-containing vulcanization accelerator are started before kneading of the rubber component and the filler, and then the filler is added to the obtained kneaded product and kneaded at a kneading temperature of 120° C. or higher, it is possible to produce the rubber composition with good fracture property.

The invention claimed is:

1. A method for manufacturing a rubber composition for a tire, comprising the steps of:
   kneading a diene-based rubber component, a sulfur donor, and a sulfur atom-containing vulcanization accelerator together before kneading the diene-based rubber component with a filler; and
   adding a filler to an obtained kneaded product and performing kneading at a kneading temperature of 120° C. or higher;
   wherein the sulfur donor is an organic compound having a structure of —$S_n$—, wherein n≥2;
   wherein the diene-based rubber component only consists of one or more selected from the group consisting of an isoprene-based rubber, butadiene rubber (BR), styrene butadiene rubber (SBR), styrene isoprene butadiene rubber (SIBR), chloroprene rubber (CR), and acrylonitrile butadiene rubber (NBR);
   wherein the diene-based rubber component contains 20% by mass or more of a styrene butadiene rubber in which a vinyl content is 20% or more; and
   wherein the method is performed without adding di-2-benzothiazoyl disulfide (MBTS).

2. The method for manufacturing a rubber composition for a tire of claim 1,
   wherein after adding the filler and performing kneading at the kneading temperature of 120° C. or higher, a vulcanization agent is kneaded therein.

3. The method for manufacturing a rubber composition for a tire of claim 1,
   wherein after adding the filler and performing kneading at the kneading temperature of 120° C. or higher, a vulcanization accelerator is added and kneaded in the kneaded product such that a mass ratio of a compounding amount of the vulcanization accelerator to a compounding amount of the sulfur atom-containing vulcanization accelerator is more than 0% and 80% or less.

4. The method for manufacturing a rubber composition for a tire of claim 1,
   wherein the sulfur atom-containing vulcanization accelerator is one or more compounds selected from the group consisting of 2-mercaptobenzothiazole (MBT), a zinc salt of 2-mercaptobenzothiazole (ZnMBT), a cyclohexylamine salt of 2-mercaptobenzothiazole (CMBT), sulfenamide-based vulcanization accelerator, tetramethylthiuram monosulfide (TMTM), and a dithiocarbamate-based vulcanization accelerator.

5. The method for manufacturing a rubber composition for a tire of claim 1,
   wherein the sulfur atom-containing vulcanization accelerator is one or more compounds selected from the group consisting of 2-mercaptobenzothiazole (MBT), a zinc salt of 2-mercaptobenzothiazole (ZnMBT), a cyclohexylamine salt of 2-mercaptobenzothiazole (CMBT), N-cyclohexyl-2-benzothiazolylsulfenamide (CBS), N-(tert-butyl)-2-benzothiazole sulfenamide (TBBS), N,N-dicyclohexyl-2-benzothiazolylsulfenamide, tetramethylthiuram monosulfide (TMTM), piperidinium pentamethylene dithiocarbamate (PPDC), zinc dimethyldithiocarbamate (ZnMDC), zinc diethyl dithiocarbamate (ZnEDC), zinc dibutyldithiocarbamate (ZnBDC), zinc N-ethyl-N-phenyl dithiocarbamate (ZnEPDC), zinc N-pentamethylenedithiocarbamate (ZnPDC), sodium dibutyldithiocarbamate (NaBDC), copper dimethyldithiocarbamate (CuMDC), iron dimethyldithiocarbamate (FeMDC), and tellurium diethyldithiocarbamate (TeEDC).

6. The method for manufacturing a rubber composition for a tire of claim 1,
   wherein said diene-based rubber component, said sulfur donor, and said sulfur atom-containing vulcanization accelerator are not added during said kneading of said obtained kneaded product and said filler.

7. The method for manufacturing a rubber composition for a tire of claim 1, comprising forming a pendant type structure wherein a —S-vulcanization accelerator residue is bonded to the rubber component.

8. A method for manufacturing a tire, comprising the steps of:
   molding a green tire by forming a tire member from the rubber composition for a tire obtained in the manufacturing method of claim 1 and combining the tire member with other tire members; and
   vulcanizing the green tire obtained in the molding step.

* * * * *